United States Patent [19]

King

[11] Patent Number: 4,627,285

[45] Date of Patent: Dec. 9, 1986

[54] POINTER FOR LIQUID FILLED GAUGES

[76] Inventor: Edwin H. King, P.O. Box 67, Newburgh, Ind. 47630

[21] Appl. No.: 718,892

[22] Filed: Apr. 2, 1985

[51] Int. Cl.⁴ ............................................ G01D 11/10
[52] U.S. Cl. ...................................... 73/430; 116/328
[58] Field of Search .......................... 73/739, 707, 430; 116/328, 330, 332; 324/125

[56] References Cited

U.S. PATENT DOCUMENTS 523,404  7/1894  Meady ..................................... 73/739
2,874,573  2/1959  Green et al. ........................... 73/739

FOREIGN PATENT DOCUMENTS 2742 of 1875  United Kingdom .................. 73/739

Primary Examiner—Jerry W. Myracle
Attorney, Agent, or Firm—Allegretti, Newitt, Witcoff & McAndrews, Ltd.

[57] ABSTRACT

An improved liquid filled gauge for measuring the temperature or pressure of a fluid. Gauge temperature or pressure readings are indicated by a pointer configured to produce substantial resistance to motion during pointer rotation. The preferred embodiment employs an elongated flat sheet pointer having three 90° twists; two in the indication end of the pointer to bound a first resistive surface, and a third in the tail of the pointer to bound a second resistive surface.

2 Claims, 5 Drawing Figures

POINTER FOR LIQUID FILLED GAUGES

BACKGROUND OF THE INVENTION

This invention relates to gauges for measuring the temperature or pressure of fluids, such as liquids or gases. More particularly, the invention relates to an improved gauge pointer that causes substantial drag when operated in a liquid making the pointer dynamically stable in a liquid filled temperature or pressure gauge. The improved gauge pointer is suitable for a gauge environment having substantial vibration or pressure fluctuation.

Although the invention is suitable for use with both temperature and pressure gauges, for purposes of illustration, this description principally concentrates pressure gauges. For the most part, the advantages and features of the invention are the same, whether used in temperature or pressure gauges.

The most common kind of pressure gauge employed in the prior art uses a "Bourdon Tube" for sensing variations in pressure. Traditionally, such Bourdon Tube pressure gauges employ a hollow tube having a generally elliptical cross section. The tube is closed at one end and is most often formed in the shape of a "C". The tube's open end is connected to the fluid to be measured, which flows into the Bourdon Tube through the open end, filling the "C". Higher pressure liquids tend to unbend the tube, which increases the radius of the "C" and results in curvilinear displacement of the closed end of the tube in a generally radial direction in the plane of the "C" and with respect to the center of the "C". A linkage mechanism is normally attached to the closed end of the Bourdon Tube "C", translating the linear displacement of the tube end, usually through a rack and pinion or related mechansim, to a gauge pointer. The gauge pointer rotates in response to the linear motion of the closed end of the Bourdon Tube and, when properly calibrated, indicates a pressure reading on a circular dial. Bourdon Tube pressure gauges of the kind described above have long been used and are well-known in the prior art.

Temperature gauges operate in a somewhat similar manner, although temperature gauges are usually not constructed with a Bourdon Tube. Generally, a gauge pointer, adapted for rotational movement to indicate temperature on a circular dial, is attached to a gear mechanism. The gear mechanism is in turn attached to a linearly moving element that is responsive to temperature changes, thereby producing corresponding gauge readings Pressure and temperature gauges of all configurations, including Bourdon Tube pressure gauges, suffer from decreased effectiveness in fluid environments having substantial vibration of the gauge or frequent fluctuations or pulsations in pressure. Vibration is usually transmitted throughout the gauge by the direct mechanical connection of the gauge components, resulting in an increase in the stress on the pressure or temperature gauge components that act to reduce the effective life of the gauge. Similarly, vibration and pressure fluctuation or pulsation, especially in pressure gauges, can cause the gauge pointer to "flutter", that is, rapidly fluctuate about an approximate pressure or temperature reading. Such pointer flutter is both annoying to individuals attempting to read the gauge and detrimental to accurate pressure measurements.

To counteract the adverse effects of pressure pulsation or gauge vibration, a variety of different techniques have been adopted in the prior art, especially for pressure gauges. Various Bourdon Tube configurations other than a "C" tube have been tried, including pressure responsive tubes wound in a spiral fashion, and helically expanding tubes, commonly known as "pig tails". In some prior art configurations, the Bourdon Tube has been replaced with a diaphragm or bellows mechanism, usually consisting of a single or plural layer membrane that has at least one surface that moves upon pressure changes. Movement of the diaphragm or bellows result in a linear motion that is translated through a system of gears or other mechanical components to a rotating gauge pointer. In almost every pressure gauge, whether it has a Bourdon Tube or is constructed in one of the other manners described above, the motion responsive mechanism is attached through a direct mechanical connection to the pointer, which indicates pressure on a flat and usually cylindrical dial.

To counteract the undesirable effects of vibration, pulsation or pressure fluctuation, modern pressure or temperature gauges are usually filled with a liquid that acts as a damper. The liquid is often a clear, dense viscous material, such as glycerin or silicone. The entire gauge is then filled with the liquid which then acts to restrain or cushion the movement of all components, including the tube or diaphragm, the gear mechanism, and the pointer. Use of a liquid damping agent tends to improve service life of the pressure or temperature gauge components and usually reduces pointer flutter to thereby improve the ease of reading temperature or pressure. Additionally pressure fluctuation or pulsation can be often corrected or minimized by adding a pulsation damper, such as a porous metalic filter, over the entrance to the pressure sensing device (such as the Bourdon Tube or diaphragm). Pulsation damping can also be reduced by installing and using a screw opening leading to the oriface, or through use of an adjustable needle-type filter valve leading to the oriface. Each of these configurations are well known in the art.

While such techniques and constructions are often adequate to eliminate several of the undesirable effects of pressure fluctuation or pulsation, they have little, if any, effect on direct gauge vibration problems. Typically, vibration of the gauge elements (including the pointer) is produced by the vibrational movement of the device or apparatus upon which the gauge is mounted, and is directly transmitted to the gauge body through the mechanical connection of the gauge to that device, rather than through the fluid being measured. For example, a pressure gauge mounted on a liquid compressor will often encounter substantial pointer flutter and corresponding component wear, because the reciprocating or related movement of the compressor is directly transferred to the gauge mount, and hence, to its internal components. To eliminate such vibration problems, temperature and pressure gauges in the prior art were often mounted on a stable platform positioned away from the source of vibration (that is, away from the vibrating machine). The fluid source was then usually connected through a series of pipes or capillary tubes to the position of the pressure or temperature gauge. While this method effectively eliminates problems associated with direct vibration, it often results in substantial inconvenience to the equipment operator, who must move away from the machine to read the temperature or pressure gauge. The need for additional piping and piping support has also added further expense to prior art pressure or temperature monitoring systems. The problems of pressure fluctuation, pulsation and vibration have therefore not been fully resolved by the solutions disclosed in the prior art, and direct drive pressure and temperature indicators still suffer from wear and the inaccuracy associated with pointer flutter.

Accordingly, it is an object of this invention to provide an improved gauge mechanism for the measurement of fluid pressure or temperature.

It is a further object of this invention to provide an improved gauge mechanism that extends the life of gauge mechanical components by reducing the wear and related stress that usually results from pressure fluctuation or pulsation, or from gauge vibration.

Another object of this invention is to provide a pressure or temperature gauge mechanism capable of providing precise gauge readings without pointer flutter.

A further object of this invention is to provide a pointer for use in a liquid filled pressure or temperature gauge that dynamically resists pointer flutter resulting from gauge vibration, or pressure fluctuation or pulsation.

An additional object of this invention is to provide an improved flutter resistant pointer that can be used with existing liquid filled temperature or pressure gauges.

Yet another object of this invention is to provide an improved pointer for a liquid filled pressure or temperature gauge mechanism that is efficient and economical to manufacture.

Still another object of this invention is to provide an improved pointer for a liquid filled pressure or temperature gauge mechanism that can be constructed as a modification to the configuration of existing gauge pointers.

SUMMARY OF THE INVENTION

These and other objects of the invention are accomplished by providing a temperature or pressure gauge mechanism having a gauge enclosure attached to a fluid source and filled with a damping liquid. Gauge temperature or pressure readings are indicated by a pointer that is attached to the mechanism, with the mechanism adapted to rotate the pointer in response to pressure or temperature changes in the measured fluid. The pointer is preferably configured to produce substantial resistance to rotation during rotation against the liquid filling the enclosure, so that pointer vibration or flutter is dampened, thereby minimizing damage to the mechanism and easing the readability of the gauge indications. The preferred embodiment of the invention uses a generally elongated flat sheet gauge pointer having three 90° twists in the elongated sheet. Two twists in the "pointer" or indication end of the gauge pointer produce a flat segment configured generally perpendicular to the plane of the pointer's rotation. A third twist produces a second such perpendicular segment, positioned at the tail of the pointer. Both segments act to provide dynamic resistance to movement of the pointer in the fluid that fills the gauge.

DETAILED DESCRIPTION OF THE PREFERRED EMBODIMENT

The preferred embodiment of this invention is a gauge for measuring the pressure or temperature of fluids. The gauge mechanism has a pointer for indicating on a marked dial, with the pointer configured for increased dynamic resistance between the gauges pointer and the fluid in which the pointer moves. In the preferred embodiment, the pointer is comprised of a generally elongated thin sheet of metallic material having one or more segments positioned generally perpendicular to the plane of the dial. Because the plane of the dial is also the plane of pointer rotation, the perpendicular positioning produces a broader portion of the pointer presenting its surface in resistance to the fluid in the direction of pointer rotation, such that dynamic drag is increased.

For illustration purposes, the preferred embodiment of the invention is described in use with a pressure gauge. It is to be understood that the invention is suitable for use with both temperature and pressure gauge, and the invention is not to be construed to be limited to only the pressure gauge configuration described in the following specification.

Figure 1:
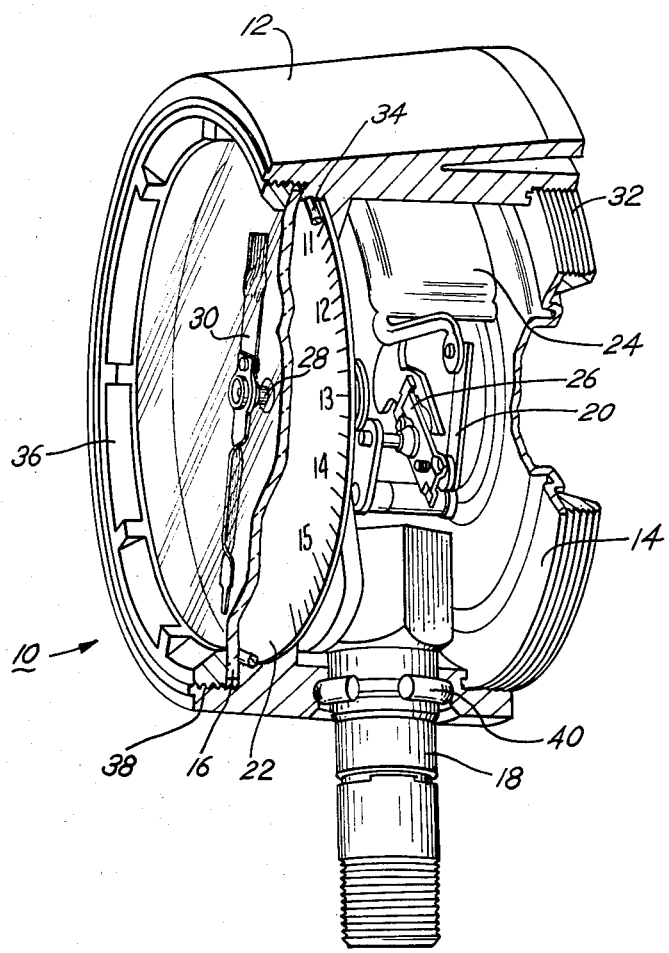
FIG. 1 is a cut-away perspective view of the preferred embodiment of the invention, displaying a liquid pressure gauge incorporating a "C" type Bourden Tube pressure mechanism and using an improved gauge pointer configured in accordance with the invention.

Referring now to the illustations and especially to FIG. 1, the preferred embodiment of the invention when used in a pressure gauge has a fluid resisting pointer attached to a conventional Bourdon Tube type pressure gauge. The gauge 10 is contained within a gauge housing 12 having a back 14 and 9 front window 16. The housing 12 encloses a fluid-source conduit 18 carrying the fluid to be measured and leading to a movement assembly 20; also enclosed in the housing is a dial 22. In the preferred embodiment, the movement 20 is a "C" type Bourdon Tube mechanism having a Bourdon Tube 24 connected to a gear mechanism 26. The gear mechanism 26 translates the cylindrical expansion of the Bourdon Tube 24 into rotational movement of a pointer axel 28. The pointer axel 28 is in turn mechanically connected to a pointer 30 such that cylindrical movement of the Bourdon Tube 24 results in rotation of the pointer 30 about the pointer axel 28. The connection is similar to a rack and pinion arrangement, and is well known in the gauge art.

Because the preferred embodiment of the invention is a liquid filled gauge, the various components secured within the gauge housing 12 must produce a leak-proof seal within the space defined by the housing 12, the back 14 and the front window 16. Thus, the back 14 is secured to the housing 12 through a thread arrangement 32. Likewise, the front window 16 is secured against the dial 22 through contact with a gasket or O-ring 34, and the front window 32 is further secured within the housing 12 by a sealing ring 36, threaded by use of ring threads 38 to the housing. Similarly, the fluid-source conduit is sealed against leakage by a conduit gasket 40 within the housing 12.

Figure 2:
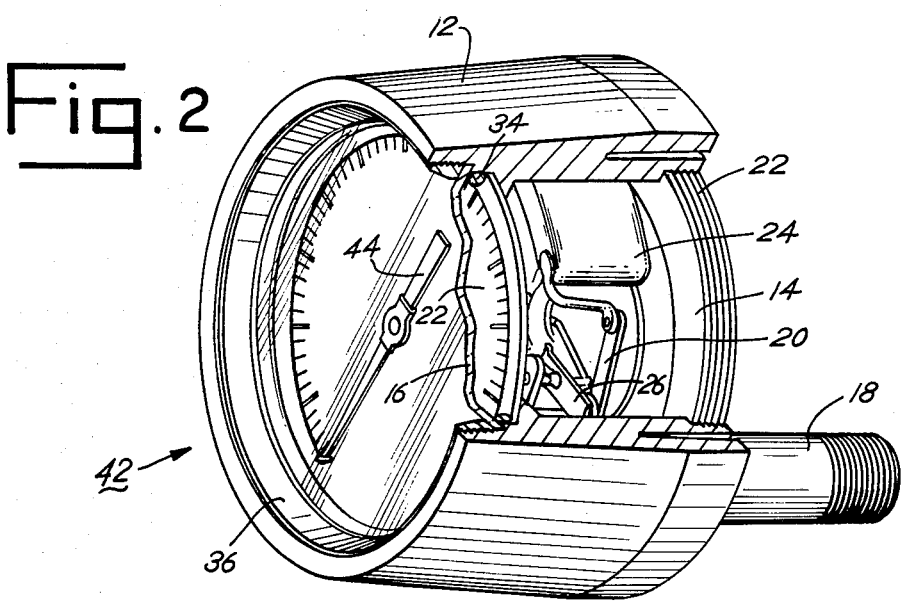
FIG. 2 is a cut-away perspective view of a liquid filled pressure gauge constructed in accordance with the teachings of the prior art and having a conventional gauge pointer.

FIG. 2 illustrates a conventional prior art liquid filled Bourdon Tube pressure gauge. Such prior art gauges possess several features in common with the preferred embodiment of the invention, including a housing 12, a back 14, a front window 16, a fluid source conduit 18, and a movement assembly 20. Likewise, prior art pressure gauges included a dial 22, a movement assembly 20, a gasket 34, a ring seal 36, and both back threads 32 and ring threads 38. However, conventional prior art pressure gauges used only conventional pointers 44 that were generally configured with little dynamic balance to movement of the pointer 44 within the filling fluid of the prior art gauge 42.

Figure 3:
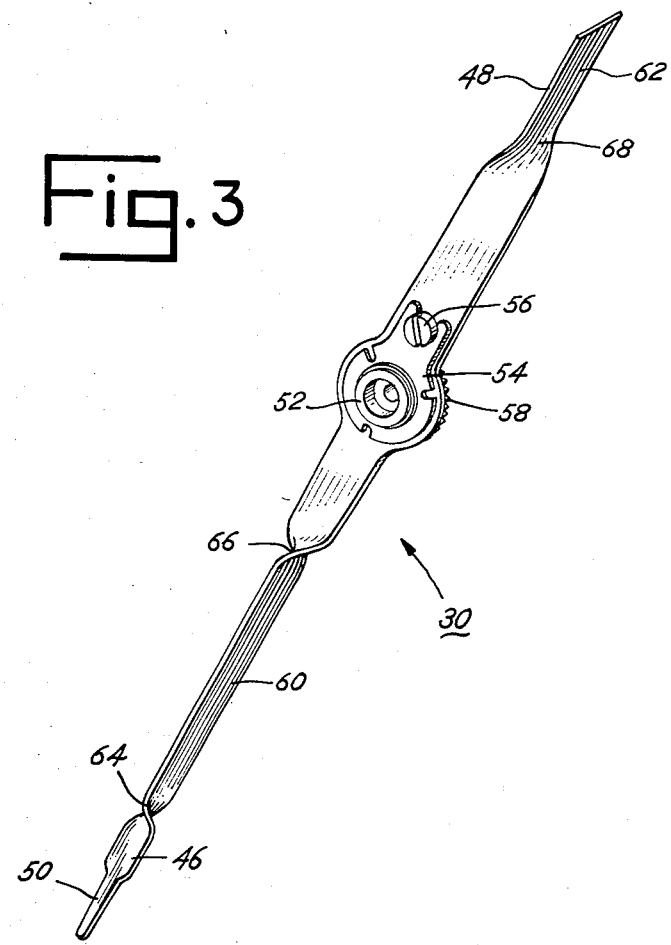
FIG. 3 is a perspective view of an improved gauge pointer configured in accordance with the invention.
Figure 4:
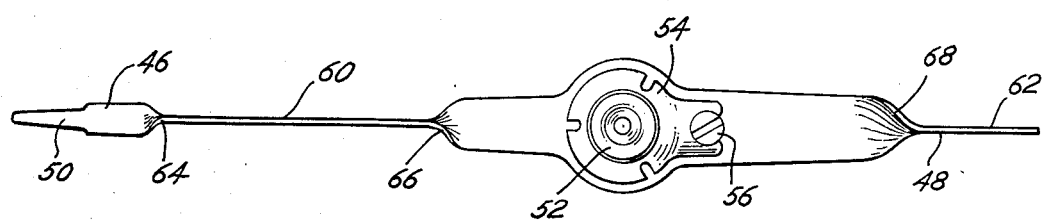
FIG. 4 is a top plan view of the improved gauge pointer illustrated in FIG. 3.
Figure 5:
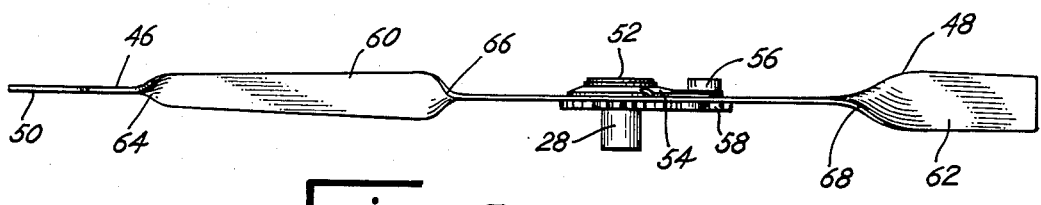
FIG. 5 is a side elevation of the improved gauge pointer illustrated in FIGS. 3 and 4.

Referring now to FIGS. 3, 4 and 5, the details of the preferred embodiment of the dynamically resistant pointer are disclosed. The preferred embodiment of the improved pointer 30 principally comprises a elongated segment of flat metallic material configured with an indicating end 46 and a tail 48. The indicating end 46 of the pointer 30 has a tapered section 50 creating a visual indication (of an arrow-type configuration) suggesting the dial position corresponding to the appropriate pressure or temperature reading. The preferred embodiment of the pointer also includes a hub 52 for attachment of the pointer 30 onto the pointer axel 28. The hub 52 acts to secure the pointer 30 to the axel 28 through use of a securing plate 54 fastened to the pointer with a bolt 56. The hub 52 is likewise secured to the pointer 30 through use of a bottom plate 58 which is threaded to the bolt 56 through the pointer 30.

The effect dynamic resistance to rotational movement of the pointer 30 about the pointer axel 28, the preferred embodiment of the pointer in this invention has dynamically resistive segments, including a front segment 60 and a rear segment 62. Resistance to movement within the fluid results from a large portion of the cross-section of the resistive segments being perpendicular to the axis of rotation (the axis corresponding to the plane of the dial 22). In the preferred embodiment, the resistive segments are created by three twists, hanging two portions of the pointer to be perpendicular to the dial plane. The preferred embodiment therefore includes a front twist 64, and a middle twist 66 creating the front resistive segment 60. Similary, the preferred embodiment includes a rear twist 68 to create the rear resistive segment 62. The use of a configuration produced by twists in the pointer to create a dynamically resistive series of segments is preferred because that configuration is relatively easy to manufacture and uses no more material than is used in a conventional pointer.

Other embodiments of the invention's pointer are possible, and the invention is not limited to the specific configuration disclosed as the preferred embodiment. For example, the pointer may have different numbers of resistive segments (it can, for example, have only one resistive segment, or it can have three, four or any number of segments). The pointer may also have its resistive segments configured in manners other than sections twisted or positioned perpendicular to the axis of the dial. For example, the resistive portions of the pointer can include dynamically resistive configurations such as cups or other concave segments, and the invention should generally be construed to include any configuration that will produce greater dynamic resistance than exists on a conventional pointer.

In the following claims, the terms used should not be construed to limit the invention to the specific embodiment disclosed in the specification and claims, but should be construed to include any gauge having a pointer configuration that is configured in accordance with the claims to be dynamically resistant to movement of the pointer in a gauge filled with fluid. Terms such as resistive segment, should be construed, except where specifically limited to a precise configuration, to include any dynamically resistive pointer configuration. Likewise, where size limitations are used in the specification, the claims should not be construed to be limited to those size configurations unless the limitations are specifically included in the claims.

What is claimed is:

1. An improved construction for measuring the temperature or pressure of a fluid filled gauge, comprising, in combination:

a gauge enclosure, the enclosure being attached to a fluid source to be measured and filled with a damping liquid;

a unitary pointer constructed from a single strip of material, the pointer indicating by its rotation the temperature or the pressure of the measured fluid and being configured to resist rotational motion of the pointer by increasing the drag on the pointer against the liquid filling the enclosure during the gauge operation and resulting pointer movement, the pointer having at least one generally flat surface positioned approximately perpendicular to the pointer's plane of rotation, with at least one segment of the pointer's flat surface being twisted to be perpendicular to the pointer's axis of rotation to form the generally flat and approximately perpendicular surface, whereby increased drag on the pointer against the damping liquid results during pointer rotation; and a mechanism adapted to rotate the pointer in response to temperature or pressure changes in the fluid source to be measured, whereby pointer fluctuation is dampened and resulting damage and wear to the mechanism from vibration related stress is reduced.

2. An improved gauge construction as claimed in claim 1, wherein the gauge is of the kind using a bourdon tube, and the pointer is constructed of metal having a tail and an indicating head, the pointer further comprising a pair of generally flat surfaces disposed opposite the pointer's axis of rotation, with the portion of each surface near the pointer's axis of rotation being generally parallel to the pointer's plane of rotation, and with two generally perpendicular segments being positioned away from the axis of rotation at the tail and near the head, the pointer further being comprised of a flat sheet with three approximately 90° twists from the plane of rotation, with one twist defining the inner limit of the tail's resistive surface, a second twist defining the inner limit of the head's resistive surface, and the final twist defining the outer limit of the head's resistive surface.

* * * * *